May 8, 1951  K. H. HACHMUTH  2,551,881
METHOD OF RECOVERING HYDROGEN FLUORIDE
Filed Sept. 5, 1947
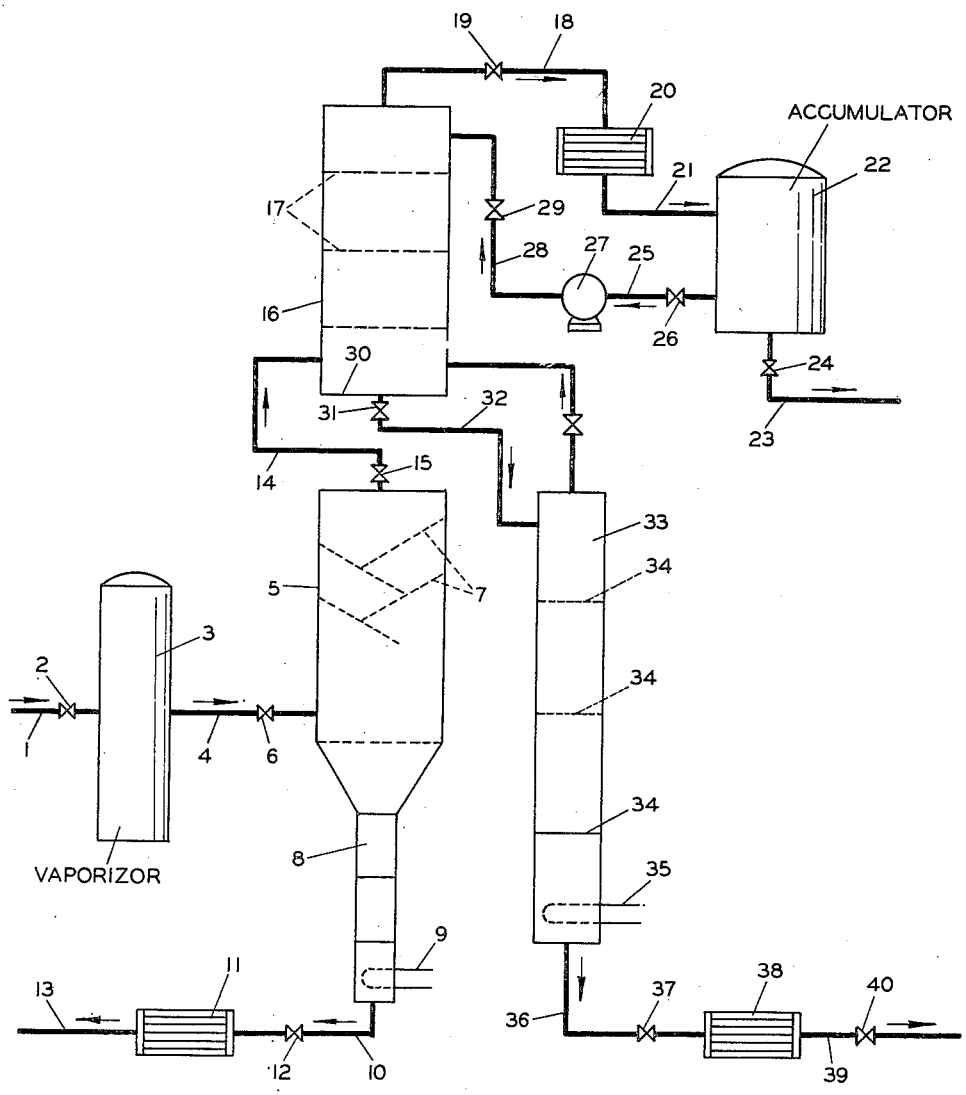
INVENTOR
KARL H. HACHMUTH
BY Hudson, Young & Guiger
ATTORNEYS Patented May 8, 1951

2,551,881

UNITED STATES PATENT OFFICE 2,551,881

METHOD OF RECOVERING HYDROGEN FLUORIDE

Karl H. Hachmuth, Bartlesville, Okla., assignor to Phillips Petroleum Company, a corporation of Delaware Application September 5, 1947, Serial No. 772,419

15 Claims. (Cl. 202—40)

This invention relates to the recovery of hydrogen fluoride, and more particularly to an improved method of recovering substantially anhydrous hydrogen fluoride from a composition of materials comprising oil, water and hydrogen fluoride.

This application is a continuation-in-part of my co-pending application Serial No. 460,701, filed October 3, 1942, now abandoned.

Substantially anhydrous hydrogen fluoride has in recent years become a highly important catalyst in properly promoting and economically effecting certain types of hydrocarbon conversions, such as the alkylation of various hydrocarbon feed stocks and the like. In the course of carrying out the above indicated hydrocarbon conversions, the hydrogen fluoride employed in the reaction becomes diluted due to its tendency to dissolve water entrained in the hydrocarbons being treated and/or water that is produced in the mixture during the processing thereof. Moreover, side reactions frequently occur to a greater or less extent while the hydrocarbon is undergoing basic reaction with the result that organic fluorides and acid soluble oils are produced, thereby diluting the hydrogen fluoride still further. It will therefore be evident that, if the hydrogen fluoride is to be continuously recycled to the zone of conversion, it is essential that diluents contained or combined therewith be removed therefrom in order to maintain the conversion efficiency as high as possible and to obtain optimum benefits.

It has heretofore been the practice in separating water and oil from hydrogen fluoride, to employ a known method and a conventional arrangement of fractionating equipment whereby the hydrogen fluoride contained in solution with the water and oil is withdrawn as an overhead product of the fractionating column and the water and oil is removed as a bottom product. Experience has demonstrated that this procedure permits a more severely corrosive concentration of hydrogen fluoride in water to be formed in a relatively small portion of the fractionating column. When columns of conventional design and composition are used, such corrosive mixtures of hydrogen fluoride and water are extremely harmful, and invariably cause premature failure of the equipment, necessitating frequent replacement of costly items of apparatus. In an endeavor to reduce replacement costs, fractionating columns, composed of materials that are more resistant to the corrosive action of the aforementioned concentration of hydrogen fluoride and water, have been fabricated and utilized. This has not proven a satisfactory solution to the problem, however, for the lowered replacement costs effected thereby are, as a rule, far less than the increased initial cost of the special columns. Additionally columns thus constructed do not usually possess the mechanical strength requisite to safe operation under varying condition of operation and for this reason are objectionable and undesirable.

It has been found, in the distillation of hydrogen fluoride-water mixtures, that certain materials of construction are relatively more rapidly corroded with HF-water concentrations containing approximately 40% or more of water than at higher HF concentrations, while other materials are more resistant to such water concentrations. This is pointed out in the patent to Calcott 2,174,118. Even with those materials corrodible at the higher water concentrations, certain of the metals and alloys are less readily corroded than others. It has been found for example, that steels in general are more susceptible to corrosion by HF-water mixtures containing approximately 37% or more water than at higher HF concentrations, and this is particularly true of the low carbon steels containing 0.35% carbon or less. Such steels are in general, a preferred material of construction for distillation columns used in distilling HF-water mixtures in commercial installations such as are used in HF alkylation plants in the oil industry. Other, more resistant materials, are not as desirable for reasons of strength, economy and utility, and in view of difficulties encountered in fabrication.

The practice of the present invention obviates the objections experienced in the past and provides a method of recovering hydrogen fluoride in an efficient, effective and economical manner. My invention, among other things, avoids the formation of severely corrosive concentrations of hydrogen fluoride and water in the main treating columns. Any undesirably corrosive mixtures that are formed in carrying out the method of this invention are isolated and treated in a relatively small column which can be readily and inexpensively replaced when necessary, or which can be formed of a material less readily corroded by the HF-water mixtures referred to. Undesirable corrosion is therefore minimized and confined to a relatively small unit that is much less costly to replace than the larger fractionators now employed, or when the more expensive and resistant alloys are used for the small unit, considerable saving in cost and ease of replacement is effected.

This invention in its basic aspects contemplates heating a liquid feed, such as a mixture of oil, water and hydrogen fluoride that is derived as a product of a hydrocarbon alkylation process, to its vaporization temperature and transmitting the same into a flash chamber wherein the vaporized feed is separated into the components of oil and vaporized hydrogen fluoride and water. The oil thus separated in the flash chamber forms minute droplets which are received by suitable mist entrainers and allowed to drain downwardly into a packed acid fractionator which may be integral with the flash chamber, or if desired, a separate unit communicating with the flash chamber by way of necessary conduits. This fractionator is preferably constructed of low carbon steel containing less than about 0.35 per cent carbon. In all events, the oil admitted into the fractionator is heated to a sufficiently high temperature to decompose a major part or substantially all of the organic fluoride compounds. The packing may be eliminated in most cases from the acid fractionator without materially impairing the benefits of this method since only minor fractionating facilities need be provided to separate oil and hydrogen fluoride. The separated oil is cooled and withdrawn from the system. The vaporized hydrogen fluoride and water in the flash chamber rise and pass into a primary fractionating means which may be a complete unit per se or may be in the nature of a section integral with the flash chamber. These materials are partially condensed into a liquid fraction comprising a mixture of hydrogen fluoride and water of such concentration that it is not severely corrosive to the materials of which the fractionator is constructed and a vapor fraction consisting essentially of anhydrous hydrogen fluoride. The vapor fraction of essentially hydrogen fluoride is withdrawn overhead, is cooled and condensed, and is then transmitted into an accumulator. A portion of the anhydrous liquid hydrogen fluoride collected in the accumulator is returned to the primary fractionating unit as reflux while the remainder is withdrawn from the system as required for other uses.

A liquid side stream of hydrogen fluoride and water is piped from the primary fractionator to a relatively small separate secondary fractionator where the separation of hydrogen fluoride and water is continued. Undesirably corrosive mixtures of hydrogen fluoride and water are necessarily produced in the secondary fractionator, for, as the hydrogen fluoride is removed overhead therefrom, the water in the remaining mixture becomes progressively more concentrated until finally a corrosive mixture of about 37 per cent or more of water in hydrogen fluoride is reached. It will be observed that in this way the handling of the more severely corrosive mixtures of water and hydrogen fluoride is confined to the secondary fractionator which by virtue of its small size, as compared to the primary fractionator, may be replaced more readily and at less cost than a single large fractionator, while the relatively less corrosive hydrogen fluoride-water mixture referred to above may be readily handled in the primary fractionation unit. The small secondary fractionator may be constructed of the same material as the primary fractionator, in which case it may be considered as "expendable," or it may be constructed of materials more resistant to the HF-water mixtures than steel, such as copper, Monel metal, etc., or the highly resistant alloys such as are referred to by Calcott 2,174,118, referred to above.

It is therefore the primary object of this invention to recover hydrogen fluoride from fluid mixtures containing the same in an effective and economical manner.

This invention has for another object the treatment of a fluid mixture comprising oil, water, and hydrogen fluoride by an improved method whereby substantially anhydrous hydrogen fluoride may be readily separated from the other constituents of the mixture.

Another object of this invention is to effectively recover substantially anhydrous hydrogen fluoride from fluid mixtures of the character indicated with a minimum formation of severely corrosive concentration of hydrogen fluoride in water which would tend to prematurely destroy equipment employed in carrying out the treating procedure.

A further object of this invention is the confining of corrosive mixtures that are normally formed in the course of treating fluid mixtures of the type mentioned above to a comparatively inexpensively replaceable portion of the equipment employed.

These, as well as other objects and advantages, will be readily apparent to persons skilled in the art upon perusal of the following detailed description and the annexed drawing which is a schematic representation of a preferred arrangement of apparatus for practicing the invention.

Referring to the drawing, I have depicted therein a conduit 1 having a control valve 2 for transmitting a liquid mixture of oil, water and hydrogen fluoride from a source, such as a hydrocarbon alkylation system (not shown), to a vaporizer 3 which is operated at an elevated temperature to vaporize the hydrogen fluoride and water. The mixture leaves the vaporizer through a conduit 4 and is admitted into a unit 5 as allowed by a valve 6. Minute liquid particles of oil are separated from vapor by suitable mist entrainers 7 that are positioned within unit 5. Oil in a liquid state is deposited in an acid oil fractionator 8 which is provided with a heater 9 that is adapted to raise the temperature of the oil sufficiently to effectively decompose substantially all of the organic fluoride compounds contained in the oil. Oil that is virtually free of water and hydrogen fluoride is withdrawn from fractionator 8 through a line 10 and is conducted into a cooler 11 as allowed by a valve 12 whence it is discharged from the system through a conduit 13. Hydrogen fluoride and water in a vaporous state rise upwardly through unit 5 and are withdrawn therefrom through a conduit 14 as allowed by a valve 15 and are introduced into the lower portion of a column 16 having a plurality of bubble trays spaced one above the other therein whereby all of the water and part of the hydrogen fluoride vapor are cooled and condensed. The remaining or vaporous portion of the hydrogen fluoride is drawn off as an overhead product from the top of tower 16 through a line 18 having a control valve 19 and is transmitted into a cooler 20 where it is liquefied before it is conducted through a conduit 21 into a liquid accumulator 22. The hydrogen fluoride liquid thus introduced into accumulator 22 is substantially anhydrous. A conduit 23 that is controlled by a valve 24 is utilized to pass the hydrogen fluoride to storage or to the alkylation system, referred to earlier, as desired.

A second outlet conduit 25 communicating with the lower portion of accumulator 22 contains a valve 26 for controlling the flow of hydrogen fluoride to a suitable pump 27 which returns part of the liquid hydrogen fluoride back into the upper part of tower 16 as reflux through the medium of a conduit 28 as permitted by a valve 29.

The bottom of tower 16 constitutes a tray 30 for collecting a liquid composition of water and hydrogen fluoride. It is to be borne in mind that the concentration of water in hydrogen fluoride in tower 16 is not sufficient to be unduly corrosive to materials commonly utilized in fractionator construction. A stream of this water and hydrogen fluoride mixture is withdrawn from tray 30 as allowed by a valve 31 and introduced into the upper portion of a second and much smaller fractionator 33 that is equipped with a series of spaced bubble trays 34 and that is provided with a heating unit 35. Liquid in the bottom of column 33 is reboiled by heater 35 to thereby drive off additional hydrogen fluoride from the mixture. The material remaining in the bottom of column 33, for example, a fluid mixture of approximately equal parts of water and hydrogen fluoride, is discharged from column 33 through a line 36 having a control valve 37, is passed thorugh a cooler 38 where it is cooled, and is then discharged from the system through a conduit 39 as allowed by a valve 40. The hydrogen fluoride vapor is removed as an overhead product from fractionator 33 and is returned to the lower part of tower 16 through a conduit 41 having a control valve 42 therein.

It will be noted that unit 5 is illustrated as being integral with acid oil fractionator 8 as was set forth earlier in this paper. These elements, if desired may be separate items of equipment with necessary flow connections. Furthermore, it will be noted that unit 5 has been illustrated as being distinct and separate from tower 16. Elements 5 and 16 may be combined into a single unit with tower 16 superimposed upon and in direct communication with unit 5.

It will be evident to persons skilled in the art that the apparatus illustrated in the drawing may be operated over a wide range of pressures between sub-atmospheric and super-atmospheric pressures to obtain the desired separation and accomplish the objects of this invention. The actual operating pressure will usually be determined by the cooling medium available for condensing the overhead anhydrous hydrogen fluoride product. It will be further evident to those skilled in the art that the individual items of equipment may be operated under various temperature conditions. Highly beneficial results may be obtained by maintaining the temperature within fractionator 5 at/or somewhat above 250° F., by maintaining the temperature in tower 16 sufficiently low to permit the condensation of water vapors admitted thereinto, by maintaining the temperature at the bottom of secondary fractionator 33 sufficiently high to drive off the hydrogen fluoride component of the mixture treated therein, such as in the neighborhood of 275° F., and by maintaining the temperature in the lower portion of fractionator 8 such that hydrogen fluoride compounds contained within the oil treated therein will be effectively decomposed and volatilized.

It is believed that the many advantages that may be derived by the practice of this invention will be readily comprehended by persons skilled in the art from the foregoing discussion and description. It is to be distinctly understood, however, that the method disclosed may be varied in several respects without departing from the spirit of the invention or the scope of the subjoined claims. All matter herein contained is to be considered as being illustrative and not in a restrictive sense except as the same may be limited by the appended claims taken in conjunction with the prior state of the art.

I claim:

1. In a method of the character described, the steps of fractionating a stream of a fluid comprising acid-soluble oil, water and hydrogen fluoride in a first fractionating means constructed of a material which is subject to corrosion by dilute aqueous hydrofluoric acid to obtain an oil fraction that is substantially free of water and hydrogen fluoride, a substantially non-corrosive water and hydrogen fluoride liquid fraction, and a substantially anhydrous hydrogen fluoride vapor fraction, while maintaining the water concentration at all points in said first fractionating means below that which will effect corrosion of said material of construction; fractionating a stream of the liquid fraction in a second fractionating means to separate additional substantially anhydrous hydrogen fluoride and a highly corrosive mixture of hydrogen fluoride and water; and transmitting hydrogen fluoride obtained in the last mentioned step into the liquid fraction in the first fractionating means.

2. The method according to claim 1 wherein a corrosive mixture of water and hydrogen fluoride is permitted to be formed only in the second fractionating means, and where said second fractionating means is constructed of a material corrodible by such HF-water mixtures containing substantial proportions of water.

3. The method according to claim 2 wherein the corrodible HF-water mixture contains more than about 37 per cent water.

4. In a method of the character described, the steps of fractionating a stream of a fluid comprising acid-soluble oil, water and hydrogen fluoride in a first fractionating means constructed of a material which is subject to corrosion by dilute aqueous hydrofluoric acid to obtain an oil fraction that is substantially free of water and hydrogen fluoride, a substantially non-corrosive water and hydrogen fluoride liquid fraction, and a substantially anhydrous hydrogen fluoride vapor fraction, while maintaining the water concentration at all points in said first fractionating means below that which will effect corrosion of said material of construction; continuously withdrawing and liquefying a stream of the vapor fraction; returning at least a portion of the so liquefied vapor fraction as reflux to the fractionating means; fractionating a stream of the liquid fraction in a second fractionating means to separate additional substantially anhydrous hydrogen fluoride and a highly corrosive mixture of hydrogen fluoride and water; and transmitting hydrogen fluoride obtained in the last mentioned step into the liquid fraction in the first fractionating means.

5. In the recovery of hydrogen fluoride from fluid mixtures with water in which anhydrous hydrogen fluoride vapor is recovered by fractionation with the successive formation of less and more severely corrosive mixtures of hydrogen fluoride and water as the water concentration increases with the removal of hydrogen fluoride to a point where the mixture becomes more severely corrosive to the fractionating equipment, the method of minimizing corrosion and localizing said corrosion in a desired portion of said fractionating equipment which comprises subjecting the initial mixture of hydrogen fluoride and water to fractionation in a primary fractionating zone and separating therefrom as an overhead product substantially anhydrous hydrogen fluoride, maintaining the proportions of hydrogen fluoride and water in said primary zone to avoid the formation of said more severely corrosive mixture of water and hydrogen fluoride therein, separating as a liquid fraction a less corrosive mixture of hydrogen fluoride and water, introducing said less corrosive mixture into a secondary fractionation zone and separating overhead additional substantially anhydrous hydrogen fluoride while permitting the concentration of water in said secondary zone to increase to such an extent as to form a more severely corrosive mixture of hydrogen fluoride and water, and introducing substantially anhydrous hydrogen fluoride separated overhead from said secondary zone into said primary zone to maintain the desired proportions of hydrogen fluoride and water therein.

6. A method according to claim 5 in which the water concentration in said primary zone is maintained at less than about 37 per cent, while the water concentration within said secondary zone is permitted to increase beyond about 37 per cent.

7. A method according to claim 5 in which a portion of the substantially anhydrous hydrogen fluoride separated overhead from the primary fractionating zone is liquefied and returned as liquid reflux to said primary zone.

8. A method for the recovery of substantially anhydrous hydrogen fluoride from a mixture thereof with a hydrocarbon and water which comprises fractionating said mixture to separate therefrom said hydrocarbon in liquid phase and a mixture of said hydrogen fluoride and water in vapor phase, introducing said mixture of hydrogen fluoride and water into a primary fractionating zone constructed of steel and maintaining therein the water concentration of said mixture below about 37 per cent thereby avoiding the formation of a highly corrosive mixture in said zone, separating overhead substantially anhydrous hydrogen fluoride, separating as a liquid product a mixture of hydrogen fluoride and water containing less than 37 per cent water, introducing said last named mixture into a secondary fractionation zone, separating overhead additional substantially anhydrous hydrogen fluoride, and separating as a liquid product a highly corrosive mixture of hydrogen fluoride and water containing over about 37 per cent water.

9. A method according to claim 8 in which the concentration of water in the primary zone is maintained below 37 per cent by the introduction of anhydrous hydrogen fluoride from said second zone.

10. A method according to claim 9 wherein the primary fractionation zone is constructed of low carbon steel containing less than about 0.35 per cent carbon.

11. A method according to claim 10 wherein the secondary fractionation zone is constructed of the same material as the first fractionation zone.

12. A method according to claim 10 wherein the secondary fractionation zone is constructed of a material more resistant to HF-water mixtures containing more than about 37 per cent water than that of the first fractionation zone.

13. A method for the recovery of substantially anhydrous hydrogen fluoride from a mixture thereof with an acid-soluble oil and water, which comprises fractionating said mixture to separate therefrom a high-boiling oil as a liquid product and a mixture of hydrogen fluoride and water as a vapor product, introducing said mixture of hydrogen fluoride and water to a primary fractionating zone constructed of steel and maintaining therein distillation conditions such that the water content of liquid therein is not greater than 37 per cent, thereby avoiding the formation of a highly corrosive liquid mixture in said zone, separating overhead substantially anhydrous hydrogen fluoride, separating as a liquid product a mixture of hydrogen fluoride and water containing less than 37 per cent water, introducing said last named mixture into a secondary fractionation zone, separating overhead additional substantially anhydrous hydrogen fluoride, and separating as liquid product a highly corrosive mixture of hydrogen fluoride and water containing over 37 per cent.

14. A method according to claim 13 in which the concentration of water in the liquids in said primary zone is maintained below 37 per cent by the introduction of anhydrous hydrogen fluoride from said second zone.

15. A method for the recovery of substantially anhydrous hydrogen fluoride from a mixture thereof with an acid-soluble oil and water, which comprises fractionating said mixture to separate therefrom a high-boiling oil in liquid phase and a mixture of said hydrogen fluoride and water in vapor phase, introducing said mixture of hydrogen fluoride and water into a primary fractionating zone constructed of a material which is subject to corrosion by dilute aqueous hydrofluoric acid and maintaining therein distillation conditions such that the water concentrations of liquids present therein are below that which will effect corrosion of said material of construction, thereby avoiding the formation of a highly corrosive liquid mixture in said zone, separating overhead substantially anhydrous hydrogen fluoride, separating as a liquid product a mixture of hydrogen fluoride and water containing water in a concentration below that which will effect corrosion of said material of construction, introducing said last named mixture into a secondary fractionation zone, separating overhead additional substantially anhydrous hydrogen fluoride, and separating as a liquid product a highly corrosive mixture of hydrogen fluoride and water.

KARL H. HACHMUTH.

REFERENCES CITED

The following references are of record in the file of this patent:

UNITED STATES PATENTS

| Number | Name | Date |
|---|---|---|
| 2,174,118 | Calcott et al. | Sept. 26, 1939 |
| 2,445,217 | Frey | July 13, 1948 |

OTHER REFERENCES

Nelson, Petroleum Refinery Engineering, pp. 450-1 (1946).

Chemical and Metallurgical Engineering, vol. 50, pp. 126-129.